(12) United States Patent
Borgsmidt et al.

(10) Patent No.: US 7,895,150 B2
(45) Date of Patent: Feb. 22, 2011

(54) ENTERPRISE PLANNING AND PERFORMANCE MANAGEMENT SYSTEM PROVIDING DOUBLE DISPATCH RETRIEVAL OF MULTIDIMENSIONAL DATA

(75) Inventors: Rasmus Borgsmidt, Luxembourg (LU); Michael Gould, Oulston (GB)

(73) Assignee: International Business Machines Corporation, Armonk, NY (US)

( * ) Notice: Subject to any disclaimer, the term of this patent is extended or adjusted under 35 U.S.C. 154(b) by 708 days.

(21) Appl. No.: 11/563,485

(22) Filed: Nov. 27, 2006

(65) Prior Publication Data

US 2008/0065690 A1 Mar. 13, 2008

Related U.S. Application Data

(60) Provisional application No. 60/842,906, filed on Sep. 7, 2006.

(51) Int. Cl.
*G06F 7/00* (2006.01)
(52) U.S. Cl. ...................................................... 707/602
(58) Field of Classification Search ...................... 707/2, 707/103–105, 600, 696, 602, 999.101
See application file for complete search history.

(56) References Cited

U.S. PATENT DOCUMENTS

| 5,956,483 | A | | 9/1999 | Grate et al. |
| 6,002,874 | A | * | 12/1999 | Bahrs et al. .................. 717/157 |
| 6,003,039 | A | | 12/1999 | Barry et al. |
| 6,151,601 | A | | 11/2000 | Papierniak et al. |
| 6,477,536 | B1 | | 11/2002 | Pasumansky et al. |
| 6,605,121 | B1 | | 8/2003 | Roderick |
| 6,609,123 | B1 | | 8/2003 | Cazemier et al. |
| 6,768,995 | B2 | | 7/2004 | Thier et al. |

(Continued)

FOREIGN PATENT DOCUMENTS

EP  1 081 611 A2  3/2001

OTHER PUBLICATIONS

U.S. Appl. No. 11/668,937, filed Jan. 30, 2007 entitled "Enterprise Performance Management Software System Having Dynamic Code Generation," by inventors Rasmus Bordgsmidt and Michael Gould.

(Continued)

*Primary Examiner*—John R. Cottingham
*Assistant Examiner*—Mohammed R Uddin
(74) *Attorney, Agent, or Firm*—Shumaker & Sieffert, P.A.

(57) ABSTRACT

An enterprise software system provides an innovative double dispatch data retrieval technique that facilitates determining type safety during compile-time. The system includes an object store for storing a multi-dimensional dataset object. The dataset object provides an interface having a first function for instantiating a non-type-specific indexer object and a second function that returns a type-specific value of the plurality of data element currently referenced by the indexer object. The system also includes an object model that stores the dataset object to the object store, invokes the first function to instantiate the indexer object within the object store, utilizes the indexer object to reference the data element of the dataset object, and invokes the second function to retrieve the type-specific value of the data element referenced by the indexer object. Because the dataset provides the second method by which a type-specific value is returned, compilers may quickly determine type-safety concerns.

20 Claims, 4 Drawing Sheets

U.S. PATENT DOCUMENTS

| | | | |
|---|---|---|---|
| 7,162,473 B2 * | 1/2007 | Dumais et al. | 707/5 |
| 7,181,450 B2 | 2/2007 | Malloy et al. | |
| 7,464,082 B2 * | 12/2008 | Weiss | 707/4 |
| 2002/0087686 A1 * | 7/2002 | Cronk | 709/225 |
| 2002/0099866 A1 * | 7/2002 | Vlissides | 709/315 |
| 2002/0116213 A1 | 8/2002 | Kavounis et al. | |
| 2004/0098712 A1 | 5/2004 | Pisupati et al. | |
| 2004/0215626 A1 | 10/2004 | Colossi et al. | |
| 2005/0256896 A1 | 11/2005 | Pfeifer et al. | |
| 2005/0278378 A1 * | 12/2005 | Frank | 707/104.1 |
| 2006/0020921 A1 | 1/2006 | Pasumansky et al. | |
| 2006/0020933 A1 | 1/2006 | Pasumansky et al. | |
| 2006/0129971 A1 * | 6/2006 | Rojer | 717/104 |
| 2006/0143225 A1 * | 6/2006 | Brendle et al. | 707/103 R |
| 2006/0235811 A1 * | 10/2006 | Fairweather | 706/12 |
| 2007/0130133 A1 | 6/2007 | Lee et al. | |
| 2007/0174812 A1 * | 7/2007 | Yang | 717/114 |
| 2007/0188491 A1 * | 8/2007 | Denelsbeck et al. | 345/426 |
| 2007/0240137 A1 * | 10/2007 | Archambault et al. | 717/140 |
| 2008/0046481 A1 | 2/2008 | Gould et al. | |
| 2008/0071843 A1 * | 3/2008 | Papadimitriou et al. | 707/204 |
| 2009/0077107 A1 * | 3/2009 | Scumniotales et al. | 707/100 |

OTHER PUBLICATIONS

Erich Gamma et al., Design Patterns: Elements of Reusable Object-Oriented Software, Design Patterns, pp. 257-271, XP002249829 (1995).

Erich Gamma et al., Design Patterns: Elements of Reusable Object-Oriented Software, Visitor Pattern, pp. 331-344, XP002340261. (1995).

James Noble, Classifying Relationships Between Object-Oriented Design Patterns, IEEE, Comput. Soc. US, pp. 98-107, XP010314483 (Nov. 9, 1998).

International Search Report and Written Opinion from corresponding PCT Application Serial No. PCT/US2007/018120 dated Apr. 10, 2008 (12 pages).

International Preliminary Report on Patentability from corresponding PCT Application Serial No. PCT/US2007/018120 mailed Mar. 19, 2009 (8 pages).

Defining Report Datasets for Multidimensional Data from an SAP NetWeaver BI System, msdn, Apr. 14, 2006, 2 pages.

Defining Report Datasets for Relational Data from an SAP Database, msdn, Apr. 14, 2006, 1 page.

"Iterator Pattern," Jan. 26, 2010 from http://en.wilkipedia.org/wiki/Iterator_pattern, last printed Jan. 26, 2010 (11 pages).

European Communication from corresponding European Application No. 07 836 899.0-2201 dated Jul. 24, 2009 (2 pages).

Written Opinion issued with European Communication from corresponding European Application No. 07 836 899.0-2201 dated Jul. 24, 2009 (3 pages).

* cited by examiner

ENTERPRISE PLANNING AND PERFORMANCE MANAGEMENT SYSTEM PROVIDING DOUBLE DISPATCH RETRIEVAL OF MULTIDIMENSIONAL DATA This application claims the benefit of U.S. Provisional Application Ser. No. 60/842,906, filed Sep. 7, 2006, the entire content of which is incorporated herein by reference.

TECHNICAL FIELD

The invention relates to enterprise computing environments, and more particularly, to enterprise performance management systems.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligence tools, enterprise reporting tools, project and resource management systems and other enterprise software systems.

Many enterprise performance management and business planning applications require a large population of users to enter data that the software then accumulates into higher level areas of responsibility in the organization. The system may perform mathematical calculations on the data, combining data submitted by one user with data submitted by another. Using the results of these calculations, the system may generate reports for review by higher management.

The voluminous planning data captured via the enterprise software system is typically stored in one or more multidimensional data cubes. Individual computers associated with the enterprise planning system maintain an object store of data objects, such as a "dataset" object, to access relevant portions of the multidimensional data within the data cubes. To facilitate data access and traversal of the multidimensional data sets, the object model may also instantiate indexer objects to calculate and maintain references (e.g., indices) into the datasets based on their dimensionality. For example, a typical indexer object provides an interface having methods to address to a "next" data element within the datasets and return the data element currently referenced by the indexer. Typically, an indexer object iterates through the data store via the move next method, and returns the currently referenced data element once a "get current" method is called.

Often a generic Indexer object is used that may be used to traverse and access datasets of a wide variety of class types. The generic Indexer object returns the referenced data element as a generic object type even though in actuality the data object may be of a specific object type, such as an object of type Double or Integer. While the generic Indexer object is flexible, i.e., may be utilized by a wide variety of calling classes, by returning a generic object, type safety verification may be difficult if not impossible to perform on the values returned by the generic Indexer object due to its ability to return only generic data types capable of being assigned to an object of any type.

SUMMARY

The invention is directed to enterprise planning and performance management techniques that facilitate multidimensional data retrieval while ensuring type safety. For example, double dispatch data retrieval techniques are described that enable an object model to safely retrieve type-specific data elements from multidimensional datasets via a generic indexer object. That is, the generic indexer object is a non-type-specific indexer object capable of referencing data of any type within a dataset object. Through the use of this technique the object model may be assured of type safety during compilation instead of run-time, which may avoid the occurrence of costly and time-consuming type-safety errors during run-time.

According to the techniques, the dataset object provides an interface having methods by which an indexer object may be instantiated within the object store and a type-specific data value of one of the plurality of data elements currently referenced by the indexer object may be returned, respectively. The object model invokes a first method, such as a constructor, to instantiate the indexer object within the data store, and utilizes the indexer object to reference one of the plurality of data elements of the dataset object in response to a data access request. The object model, next, invokes a second method to retrieve the type-specific value of the data element currently referenced by the indexer object. In this manner, the object model may return type-specific values in response to the data access request via this "double dispatch" data retrieval technique without causing errors associated with type safety. The technique is referred to herein as a "double dispatch" technique in that the object model utilizes the indexer object to reference a data element within the multidimensional dataset, but the indexer object itself does not provide a method for returning the requested element. Instead, after utilizing the indexer to reference the correct data element, the object model passes the indexer object to the dataset via the invocation of a method provided by the dataset object, so that the dataset object may return a type-specific data element.

In one embodiment, a computer-implemented method comprises storing a multidimensional dataset object to an object store within an enterprise software system. The dataset object stores a plurality of data elements arranged according to a plurality of dimensions. The dataset object provides an interface having a first function for instantiating an indexer object for referencing the data elements of the dataset and a second function that receives as input the indexer object and returns a type-specific value of one or more of the data elements based on the reference information maintained by the indexer object. The method further comprises invoking the first function to instantiate the indexer object within the object store, utilizing the indexer object to reference one of the data elements of the dataset object, and invoking the second function and passing the indexer object as a parameter to the second function to retrieve a type-specific value of the data element referenced by the indexer object.

In another embodiment, a computing system comprises an object store for storing a multi-dimensional dataset object. The dataset object stores a plurality of data elements arranged according to a plurality of dimensions. The dataset object provides an interface having a first function for instantiating an indexer object for referencing the data elements of the dataset object and a second function that receives as input the indexer object and returns a type-specific value of one of the plurality of data elements based on the reference information maintained by the indexer object. The computer system further comprises an object model that stores the multi-dimensional dataset object to the object store, invokes the first function to instantiate the indexer object within the object store, utilizes the indexer object to reference one of the data elements of the dataset object, and invokes the second function and passes the indexer object as a parameter to the second function to retrieve a type-specific value of the data element referenced by the indexer object.

In another embodiment, the invention is directed to a computer-readable medium containing instructions. The instructions cause a programmable processor to store a multidimensional dataset object to an object store within an enterprise software system. The dataset object stores a plurality of data elements arranged according to a plurality of dimensions. The dataset object provides an interface having a first function for instantiating an indexer object and a second function that receives as input the indexer object and returns a type-specific value of one or more of the data elements based on reference information maintained by the indexer object. The instructions further cause the processor to invoke the first function to instantiate the indexer object within the object store, utilize the indexer object to reference one of the data elements of the dataset object, and invoke the second function and pass the indexer object as a parameter to the second function to retrieve a type-specific value of the data element referenced by the indexer object.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
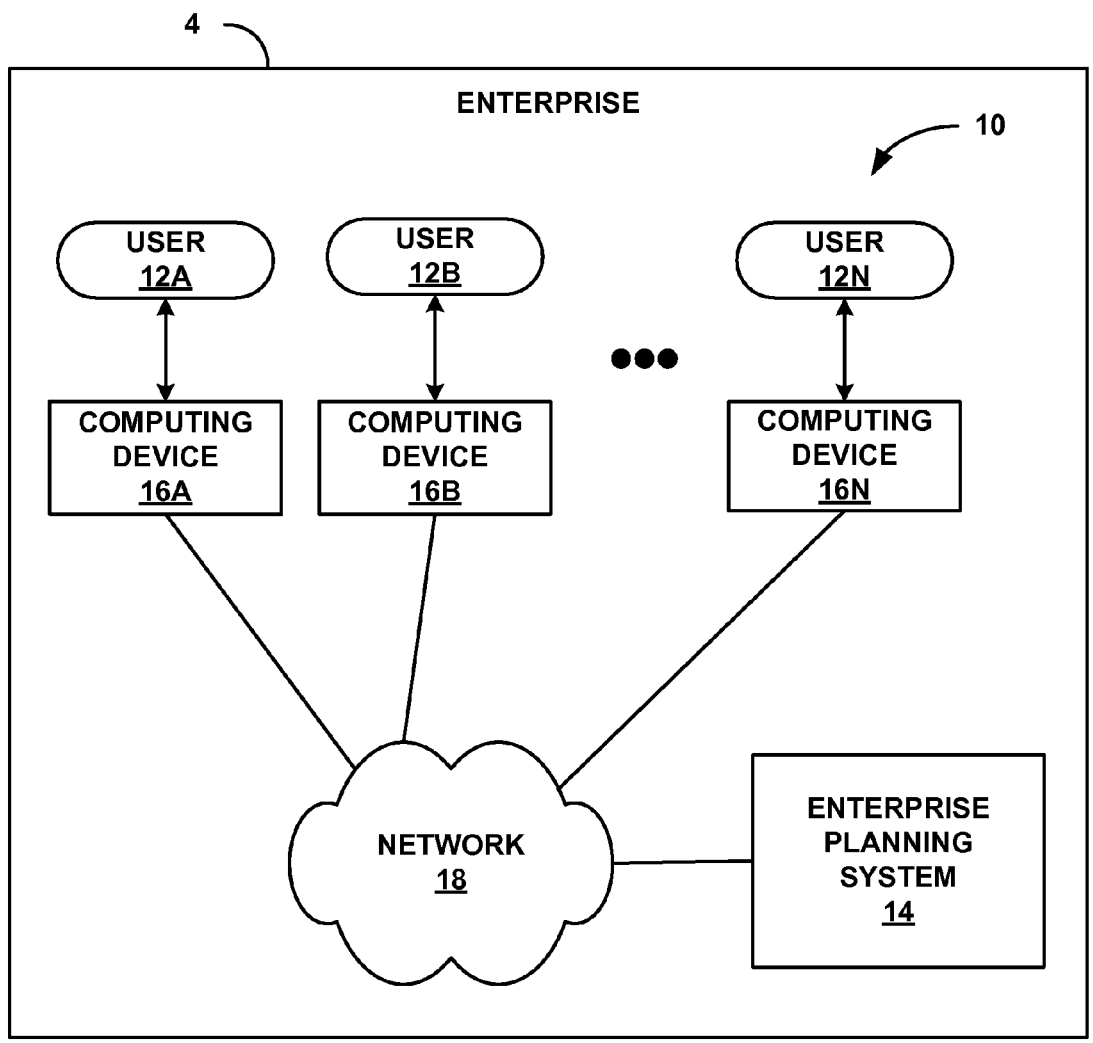
FIG. 1 is a block diagram illustrating an example enterprise having a computing environment in which a plurality of users interacts with an enterprise planning and performance management system.

FIG. 1 is a block diagram illustrating an example enterprise 4 having a computing environment 10 in which a plurality of users 12A-12N (collectively, "users 12") interact with an enterprise planning and performance management system 14. In the system shown in FIG. 1, enterprise planning and performance management system 14 communicatively couples to a number of computing devices 16A-16N (collectively, "computing devices 16") by a network 18. Users 12 interact with their respective computing devices to access enterprise planning and performance management system 14.

For exemplary purposes, the invention will be described in reference to an enterprise planning and performance management system, such as an enterprise financial or budget planning system. The techniques described herein may be readily applied to other software systems, including other large-scale enterprise software systems. Examples of enterprise software systems include order management systems, inventory management systems, sales force management systems, business intelligence tools, enterprise reporting tools, project and resource management systems and other enterprise software systems.

In general, enterprise planning and performance management system 14 enables and automates the reconciliation of top-down targets with detailed bottom-up forecasts for an enterprise. Enterprise planning and performance management system 14 implements and manages an enterprise planning process, which can be divided into three functions: (1) modeling, (2) contribution, and (3) reconciliation.

Initially, high-level enterprise managers or executives, referred to as analysts, define organizational targets, and build planning models for the enterprise. The analysts may include, for example, financial analysts, such as the chief financial officer, senior financial analysts or product and sales analysts. More specifically, the analysts develop a model having a number of hierarchically arranged nodes representing various cost centers within the organization, such as business units or departments. The analysts specify corporate target data for each node of the organizational hierarchy. Corporate target data may include financial data, revenue data, order data, inventory data, and the like, depending on the particular enterprise planning activity being carried out by the enterprise.

Next, the analysts assign one or more enterprise users to each node, such as managers, supervisors, sales representatives, lab managers, or the like, that are responsible for enterprise planning for the cost center corresponding to the node. Each enterprise user may be designated as a contributor that provides planning data to enterprise planning and performance management system 14, a reviewer that accepts or rejects contributions from the contributors, or both. The contributors and reviewers may be authorized users within the enterprise or within other entities coupled to network 18, such as suppliers or customers.

Typically, enterprise users 12 that are designated as contributors interact with enterprise planning and performance management system 14 to input detailed forecasts in the form of contribution data. As described above, enterprise users 12 may provide detailed financial forecasts, revenue forecasts, order forecasts, inventory forecasts, estimated resource requirements, and the like, depending on the particular enterprise planning activity being carried out by the enterprise.

Enterprise planning and performance management system 14 automates the reconciliation of the forecast data with the corporate target data provided by the analysts. In particular, enterprise planning and performance management system 14 operates in accordance with a defined model, i.e., the enterprise planning model created by the analysts, to provide a hierarchical planning process having multiple reconciliation levels. As each of the contributors provides his or her contribution data, enterprise planning and performance management system 14 automatically aggregates the contribution data across the enterprise in real-time, and provides access to the aggregated data to enterprise users 12 designated as reviewers associated with higher levels of the enterprise. In particular, upon receiving contribution data from the contributors, enterprise planning and performance management system 14 identifies all higher levels of the organizational model affected by the newly received contribution data, and calculates new aggregate totals at each level in real-time.

Consequently, the reviewers view aggregated data across the enterprise in real-time during the enterprise planning session. At each level, enterprise planning and performance management system 14 ensures that the reviewers, as defined by the nodes of the enterprise model, reconcile the target data with the forecast data. Each of the reviewers may, for example, reject or accept the contribution data in view of corporate targets provided by the analysts. This process continues until the contribution data is ultimately approved by the highest level of the organizational hierarchy, thereby ensuring that the contribution data from the contributors reconciles with corporate targets provided by the analysts.

In this manner, enterprise planning and performance management system 14 may provide more accurate enterprise planning than with conventional techniques. For example, enterprise planning and performance management system 14 may improve the accuracy and predictability of enterprise planning by enabling organizations to reconcile corporate models and organizational targets with detailed forecasts. The techniques may provide a platform that delivers collaborative, real-time planning capabilities, without requiring offline consolidation and aggregation of forecasts. Because enterprise planning and performance management system 14 can aggregate contribution data in real-time, all users 12 can be presented with an accurate, up-to-date view of the numbers. Further, the architecture of enterprise planning and performance management system 14 can readily scale to thousands of users, and may be designed around best planning practices. In addition, the techniques enabling high participation by enterprise users 12, i.e., the contributors and reviewers, allowing accurate planning cycles to be reduced.

Enterprise users 12 may utilize a variety of computing devices to interact with enterprise planning and performance management system 14 via network 18. For example, an enterprise user may interact with enterprise planning and performance management system 14 using a laptop computer, desktop computer, or the like, running a web browser, such as Internet Explorer™ from Microsoft Corporation of Redmond, Wash. Alternatively, an enterprise user may use a personal digital assistant (PDA), such as a Palm™ organizer from Palm Inc. of Santa Clara, Calif., a web-enabled cellular phone, or similar device.

Network 18 represents any communication network, such as a packet-based digital network like the Internet. In this manner, system 10 can readily scale to suit large enterprises. Enterprise users 12 may directly access enterprise planning and performance management system 14 via a local area network, or may remotely access enterprise planning and performance management system 14 via a virtual private network, remote dial-up, or similar remote access communication mechanism.

Enterprise planning and performance management system 14 may utilize a "cutdown" process by which the multi-dimensional data store is "sliced" for each user 12 in accordance with the defined enterprise model. During this process, enterprise planning and performance management system 14 identifies areas of the defined model to which users 12 are assigned, either as contributors or reviewers, and "slices" the data store based on the assignments. When a given user 12 logs in and proceeds with an enterprise planning activity, enterprise planning and performance management system 14 communicates the respective data slice to the respective computing device 16 for display to the user via the extended spreadsheet application. In this fashion, enterprise planning and performance management system 14 need not communicate the entire model to each of users 12, thereby reducing communication time as well as resource requirements. Instead, each user 12 receives only relevant information. Users 12 interact with computing devices 16 to capture contribution data, and to reconcile the contribution data with organizational targets.

As described herein, each of computing devices 16 provide an innovative double dispatch data retrieval technique that enables planning applications (not shown in FIG. 1) to safely retrieve referenced data elements of a dataset via an indexer object. Typically, the planning applications interact with an object model interface, and more particularly, an application programming interface (API), to specify requests to an object model. Via these requests, the planning applications cause the object model to store a dataset to an object store, wherein the dataset defines a first function for instantiating an indexer object and a second function that returns a type safe value of an item currently referenced by the indexer object. While storing the dataset, the object model invokes the first function to instantiate the indexer object. Upon receiving a subsequent request for a data element of the dataset, the object model utilizes the indexer object to reference the requested data element and invokes the second function to safely retrieve the value of the item referenced by the indexer object.

This data retrieval technique is "double dispatch" in that the object model utilizes the indexer object to reference the requested data element, but a method of the indexer object itself is not used for returning the requested element. Instead, the object model passes the indexer object to the dataset as an input parameter to the second function provided by the dataset object, so that the dataset object may return a type-specific data element. This innovated double dispatch data retrieval technique enables type safety, because, unlike conventional indexer objects, the indexer object does not return a data element of a generic data object type. Instead, the double dispatch data retrieval technique described herein allows the indexer object to remain generic in that the object model may utilize the indexer object for any type-specific dataset object, while the more type-specific dataset object provides a type-specific data element referenced by the indexer object. Thus, during compilation of such objects, the compiler may ensure type safety, as no data elements are returned of a generic object type. Moreover, the double dispatch data retrieval technique may, in some instances, avoid computing the reference to the requested data element, as described below in more detail.

Figure 2:
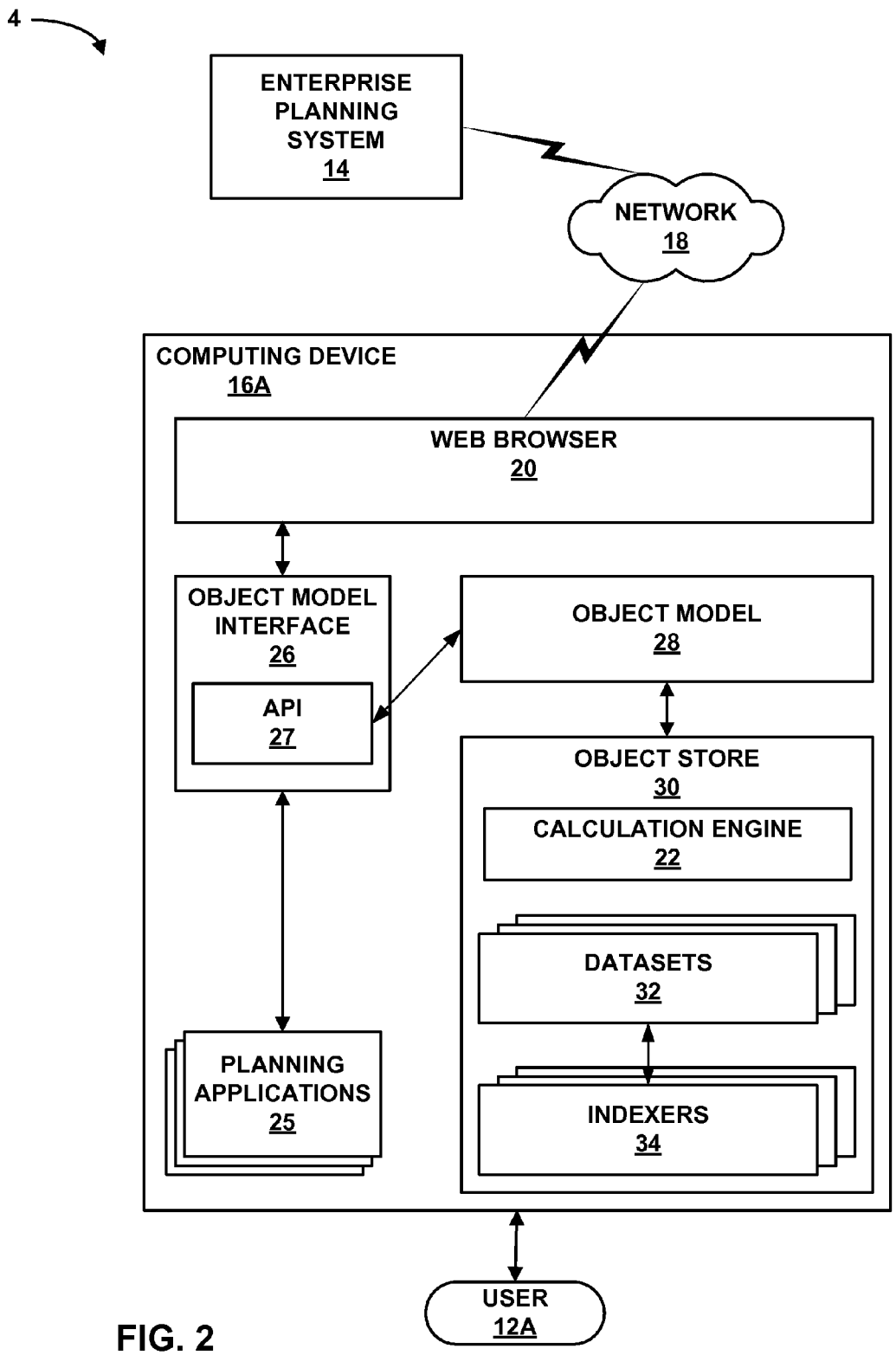
FIG. 2 is a block diagram illustrating one embodiment of a computing device for interacting with an enterprise planning and performance management system.

FIG. 2 is a block diagram illustrating one embodiment of a computing device 16A for interacting with enterprise planning and performance management system 14. In the exemplary embodiment, computing device 16A includes a web browser 20, one or more planning applications 25, an object model interface 26, an object model 28, and an object store 30. Computing device 16A includes computer-readable media to store executable instructions for causing a programmable processor to carry out the methods described herein.

Planning applications 25 represent planning applications executing on computing device 16A. For example, planning applications 25 may include reporting tools, modeling tools, spreadsheet applications, data collection templates, business intelligence tools, or other types of enterprise planning applications.

Object model interface 26 comprises an application programming interface (API) 27 that exposes object model 28. For example, object model 28 may be a metadata model for data cube 24. Object store 30 may comprise memory, such as a cache, that stores specific instantiations of object model 28.

In general, object model 28 represents any hierarchy of data objects, and may comprise a series of collections and objects within the collections. In other words, object model 28 may comprises a hierarchy of objects, each of which contains a collection which in turn provides access to one or more objects. Object model 28 may be wrapped to protect the objects within the collections. In this way, user 12A and planning applications 25 cannot directly alter the data within object model 28. Instead, planning applications 25 interacts with object model 28 via object model interface 26, and more particularly API 27, to specify operations object model 28 may perform. In particular, object model interface 26 receives operation calls from planning applications 25 via API 27 and may return the result of the operations to planning applications 25.

In the example of enterprise planning, user 12A may interact with web browser 20 to enter and manipulate enterprise planning data, such as budget or forecast data. Data sets 32 contain multidimensional planning data, which may include top-down targets, and bottom-up contribution data, and allows all calculations for an enterprise planning session to be performed locally by computing device 16A. Therefore, in this example, a contributor can modify his or her respective contribution data, and perform calculations necessary for the enterprise planning process without necessarily accessing enterprise planning system 14. User 12A may save the planning data locally, and submit the planning data to enterprise planning system 14 for aggregation with the planning data from other users 12.

Enterprise planning and performance management system 14 automatically aggregates the contribution data across enterprise 4 in real-time, and provides access to the aggregated data to reviewers associated with higher levels of the enterprise. This process continues until the contribution data is ultimately approved by the reviewers associated with the highest level of the organizational hierarchy, thereby ensuring that the contribution data from the contributors reconciles with corporate targets.

In one embodiment, calculation engine 22 and data sets 32 are loaded for use during the enterprise planning session. Calculation engine 22 may, for example, comprise a forward calculation engine 22 wrapped in an Active X object built in an array-based language. In other embodiments, calculation engine 22 may be implemented by creating layered function datasets within object store 30.

As illustrated in FIG. 2, object store 30 includes datasets 32 and indexers 34. Datasets 32 each comprises a multi-dimensional object stored in accordance with object model 28. Indexers 34 may each comprise an indexer object referencing data elements within one of datasets 32, where one or more of indexers 34 may reference the same one of datasets 32. Datasets 32 may each be instantiations of classes implementing the IDataset interfaces, where the IDataset interface includes two methods. The first method may comprise a "getIndexer" method to instantiate one of indexers 34 and associate the newly instantiated one of indexers 34 to the calling one of datasets 32. In some embodiments, the "getIndexer" method may return an instantiation of a previously defined, custom indexer class that was dynamically generated with the appropriate references to dataset 32. That is, the getIndexer method may dynamically generate a custom indexer class at runtime and then instantiate an instance of the custom indexer class. Subsequent invocations of the first function to instantiate the indexer object may not need to regenerate the custom indexer class. The second method may comprise a "getElement" method that accepts an Indexer 34 as a parameter. Upon invoking the "getElement" method by passing an indexer 34, the "getElement" method returns value of the data element referenced by the passed indexer 34.

Indexers 34 may each be instantiations of classes implementing the IIndexer interface, where the IIndexer interface includes a third method for referencing the next data element of the associated one of datasets 32. The third method may comprise a "moveNext" method, whereupon invoking the "moveNext" method, the calling indexer 34 moves, or updates, its reference to an associated one of datasets 32 such that the reference references the next data element within datasets 32. The "moveNext" method moves the reference to the sequential next data element of the associated dataset 32.

That is, indexers 34 reference datasets 32 according to an order, which may follow the order defined by the underlying dataset. In other embodiments, a custom view of a dataset may be defined by selecting the data elements in accordance with a pattern. In some cases, an indexer may sequentially follow the pattern described by the custom view, yet traverse the underlying dataset in a non-sequential pattern. Moreover, the indexer may not necessarily traverse all of the elements of the dataset, and may access some of the elements multiple times depending on the defined view. Examples of a virtual dataset capable of defining a custom view of a dataset are described in U.S. Patent Publication No. 2008/0046481, filed Nov. 28, 2006, entitled VIRTUAL MULTIDIMENSIONAL DATASETS FOR ENTERPRISE SOFTWARE SYSTEMS, the contents of which are incorporated herein by reference.

Planning applications 25 specify operations via API 27 that object model 28 performs upon object store 30. These operations, such as the select operation described below, may require object model 28 to instantiate datasets 32 and indexers 34. In particular, object model 28 may instantiate datasets 32 having IDataset interfaces, for example. Once instantiated, object model 28 instantiates and associates an indexer 34 by calling the "getIndexer" method, described above, using the newly instantiated one of datasets 32 as the calling object. After instantiating dataset 32 and an associated one of indexers 34, object model 38 may await further operations, such as a data request, issued from one of planning applications 25 via API 27.

Upon receiving a subsequent data request, for example, object model 28 may access the appropriate one of indexers 34 that references the one of datasets 32 that stores the requested data. Object model 28 utilizes this indexer 34 to reference the data element of the appropriate one of datasets 32 that stores the requested data, and more particularly, invokes the "moveNext" method until the associated indexer 34 references the requested data element. Once the associated indexer 34 references the requested data element, object model 28 next invokes the second method, or "getElement" method of the appropriate one of datasets 32 passing the associated indexer 34 as a parameter for the "getElement" method. Upon invoking the "getElement" method, the appropriate dataset 32 safely returns the value of the request data element referenced by the associated indexer 34. "Safely" above refers to safely returning a type-specific object instead of a generic object, which would not ensure type safety. Thus, "safely" refers to type safety. This double dispatch data retrieval technique enables compilers to determine type-safety of the underlying classes at compile time, unlike conventional data retrieval techniques that do not support type-safety determination during compile time. By enabling type-safety checks at compile time, object model 28 may safely invoke a generic indexer 34 without fear of violating type safety concerns during run-time, unlike conventional data retrieval techniques that may encounter debilitating type safety issues during run-time with little recourse.

Figure 3:
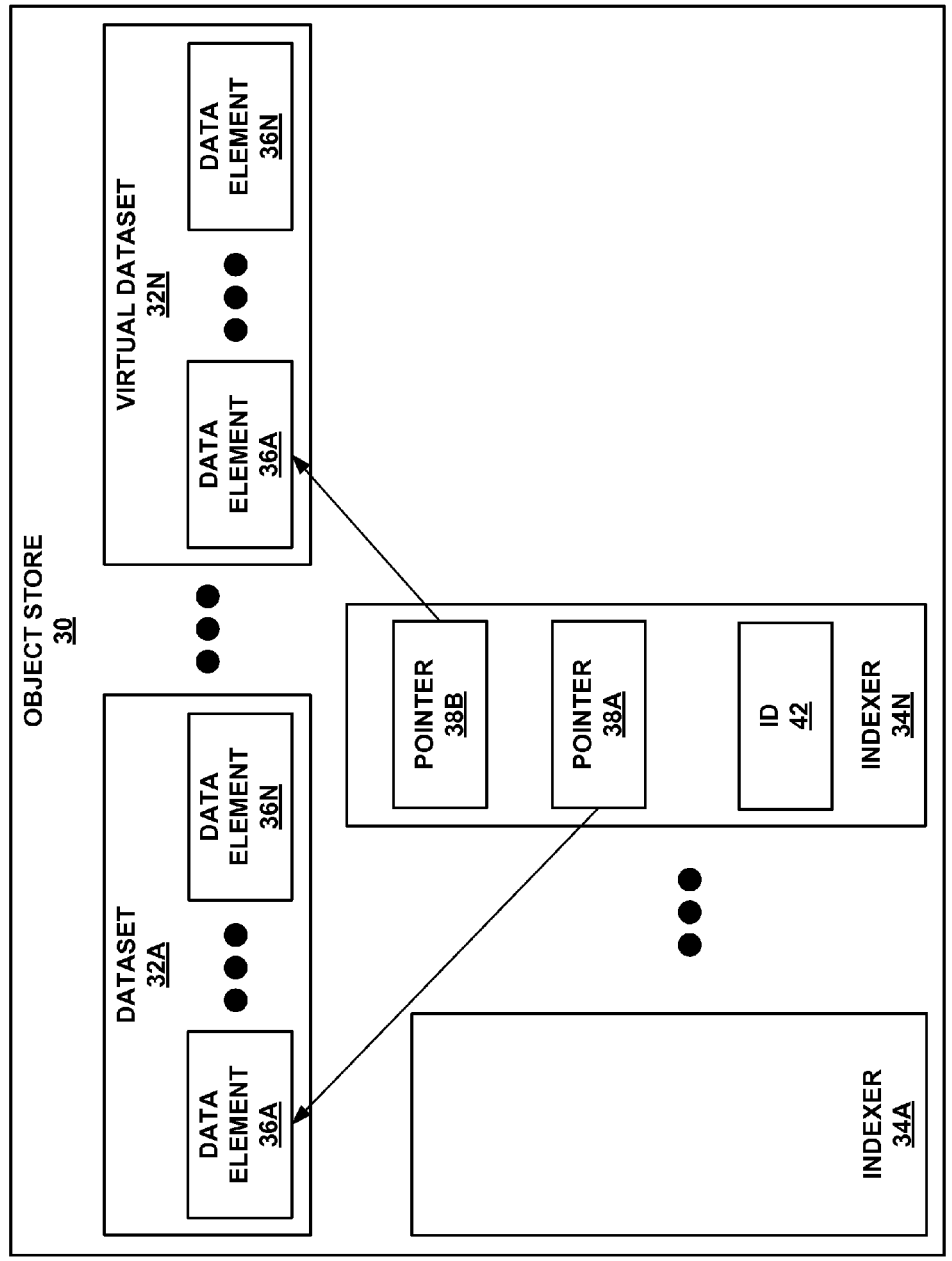
FIG. 3 is a block diagram illustrating one example embodiment of the object store of FIG. 2 in more detail.

FIG. 3 is a block diagram illustrating an example embodiment of object store 30 of FIG. 2 in more detail. In the example of FIG. 3A, datasets 32 are illustrated to include a dataset 32A and a virtual dataset 32N. In addition, indexers 34 are illustrated as indexers 34A-34N. Although only indexer 34N is shown in detail, indexers 34A-34M may be substantially similar to indexer 34N as illustrated in FIG. 3A.

Each of datasets 32 may comprise a collection of data elements 36A-36N ("data elements 36") storing multi-dimensional data. Alternatively, as shown in this example, datasets 32 include one or more "virtual datasets." Virtual dataset 32N, for example, may be referenced and manipulated as multidimensional data set. However, instead of storing actual multidimensional data, the virtual datasets contain reference information for resolving to all or portions of one or more underlying multi-dimensional data sets when necessary. The virtual datasets may be manipulated in the same manner as a "real" dataset that stores multidimensional data. In this regard, the virtual datasets are generally indistinguishable from real datasets from the view of enterprise software applications. The enterprise software applications can create virtual datasets and perform intermediate operations to manipulate the virtual datasets without necessarily resolving the virtual datasets to the multidimensional data contained within the underlying datasets. In this manner, the virtual datasets do not consume vast amounts of resources by storing multidimensional data. Further, the virtual datasets avoid any consistency and synchronization issues that may arise when separate datasets storing multidimensional data are created and manipulated.

In the example of FIG. 3, each of indexers 34 maintains respective indices or other reference information to address and traverse the multidimensional data of their constituent datasets 32 based on the dimensionality of the respective dataset. For example, indexer 34N maintains pointers 38A, 38B, and identifier ("ID") 42. As discussed in further detail below, indexer 34N maintains a pointer 38B to traverse the ordered reference information of virtual data set 32N, and maintains an additional pointer 38A to reference data elements of dataset 32A from which the data elements 36N were selected. Typically, pointers 38A, 38B store a memory address that references the beginning memory address of a referenced data element 36A-36N. Alternatively, indices may be maintained to identify particular data elements along the dimensions of the datasets. ID 42 represents an identifier or handle that identifies indexer 34N to the one of datasets 32 that originally instantiated it, i.e., dataset 32N in this example.

Initially, object store 30 may comprise no datasets 32 or indexers 34. Object model 28 may receive requests to instantiate datasets 32 via API 27. For example, via API 27, object model 28 may receive the following select operation to create a virtual dataset:

Dataset 32N=Dataset 32A.select(Dataset 32B), where the resultant dataset 32N represents a virtual dataset, dataset 32A represents a source dataset, and dataset 32B represents a selector dataset. Upon receiving the above select operation, object model 28 instantiates virtual dataset 32N. However, in this example, data elements 36 of dataset 32N are not actual data elements but instead represent reference information that, when resolved, contains indices to the underlying selection of data elements 36 of dataset 32A, as defined by selector dataset 32B.

Upon instantiating datasets 32 in some embodiments, object model 28 automatically instantiates one of indexers 34 for each of datasets 32 so as to reference data elements 36 stored within datasets 32. In other embodiments, object model 28 may not automatically instantiate one of indexers 34 for each of datasets 32 but may await a data access request from planning applications 25 via API 27 before instantiating an indexer 34 for the one of datasets 32 that stores the requested data in its data elements 36.

Assuming indexers 34 are instantiated in response to receiving a data access request, object model 28 instantiates indexers 34 via a "getIndexer" method defined within the IDataset interface. The "getIndexer" method may allow object model 28 to define patterns 40 so as to satisfy the particular data access request. Returning to the virtual dataset example described above, in response to a data request for data elements 36 of virtual dataset 32N, object model 28 may invoke the getIndexer function as follows:

Indexer 34N=Dataset 32N.getIndexer( ).

Indexer 34N, in this instance, is associated with virtual dataset 32N, and its ID 42 links indexer 34N to virtual dataset 32N. Pointer 38B comprises an address into virtual selection dataset 32N, and in particular, the address of data element 36A of dataset 32N.

Upon receiving the data access request and instantiating one of indexers 34A, object model 28 calls the "getElement" method via the appropriate one of datasets 32 to retrieve the value stored to the one of data elements 36A-36N currently referenced by pointers 38A, B. For example, object model 28 may make the following call to retrieve a data element:

Dataset 32N.getElement(Indexer 34N).

In this instance example, indexer 34N determines that the referenced dataset, i.e., dataset 32N, invoked the getElement method is a virtual data set. Instead of utilizing pointer 38B which references virtual data elements within virtual dataset 32N, indexer 34N utilizes pointer 38A to directly access data element 36A from the underlying dataset 32A. In other words, for virtual dataset 32N, indexer 34N maintains a second internal pointer 38A in addition to pointer 38B. In response to the getElement call, indexer 34N recognizes that the dataset being traversed is a virtual dataset and instead of using pointer 38B (which maintains a location within the ordered selection), utilizes pointer 38A instead to retrieve data directly from the underlying (non-virtual) dataset 32A. In this embodiment, when moveNext is called, indexer 34N increments pointer 38B to traverse the ordered virtual data elements of virtual dataset 34N, and performs the necessary computations to update pointer 38A according to the pattern (i.e., custom view) defined by the selection used to create virtual dataset 34N. Object model 28 repeats this process until the data access request is satisfied. In this manner embodiments, optimizations may occur within object store 30 such that indexers 34 does not need to re-compute pointers upon being passed into a "getElement" method of its originally instantiated one of datasets 32. For example, as discussed above, a selected order of data elements may be sequentially traversed with an indexer using a moveNext call. However, provided the indexer has knowledge of the structure of the underlying datasets, as in the above example, the indexer need not recompute the pointer(s) into the underlying dataset(s) in response to a getElement call even though data elements are selected from those underlying datasets in a non-linear pattern. In this manner, the double dispatch data retrieval technique may allow for quick and efficient data retrieval via the above described optimization, as well as, facilitate type safety concerns.

Figure 4:
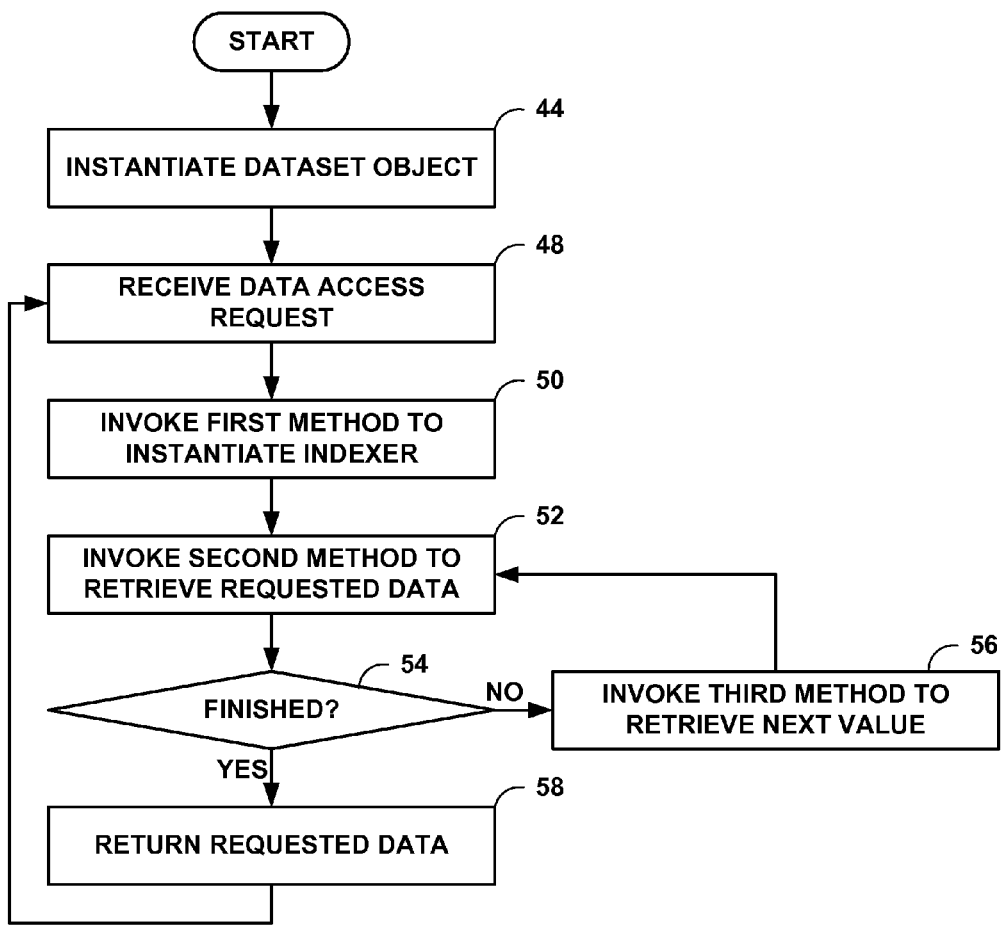
FIG. 4 is a flowchart illustrating exemplary operation of a client computing device in performing the double dispatch data retrieval techniques described herein.

FIG. 4 is a flowchart illustrating exemplary operation of a client computing device, such as computing device 16A of FIG. 2, in performing the double dispatch data retrieval techniques described herein. Although described in reference to FIGS. 2, 3, the double dispatch data retrieval techniques may be performed by any computing device associated with an enterprise planning and performance management system capable of performing the techniques, and the invention should not be limited to the illustrated embodiments.

Initially, object model 28 of computing device 16A may instantiate any number of datasets 32 within object store 32 for access to one or more data cubes storing multidimensional data (44). In some embodiments, object model 28 instantiates datasets 32 during the cut-down process described above and instantiates datasets 32 according to the user logging into enterprise planning and performance management system 14. In other embodiments, object model 28 instantiates object model 30 with datasets 32 only upon receiving requests from planning applications 25 to access or manipulate all or portions of multidimensional data from the data cubes. Assuming indexers 34 are only instantiated upon receiving a data access request from planning applications 25 via API 27, object model 28 awaits a data access request from planning applications 25.

Upon receiving a data access request (48), object model 28 instantiates an indexer 34A, for example, to reference the appropriate one of datasets 32 via a first method, which in this case, it is assumed dataset 32A represents the appropriate one of datasets 32 because it stores the requested data in data elements 36A-36N (50). As described above, the first method includes a "getIndexer" method, which instantiates and associated indexer 34A with dataset 32A.

Upon instantiating indexer 34A, object model 28 may invoke a second method, e.g., a "moveNext" method to initialize indexer 34A to the first data element, which may be defined by a pattern or a custom view of the underlying data set (52). If that method does not return false (i.e., the pattern has not been completely traversed) (no of 54), the object model 28 invokes a third method (e.g., a "getElement" method) to retrieve the value of the data element 36 referenced by pointer 38A (58). As described above, the optimization may apply to this process, whereby ID 42A may enable dataset 32A to quickly return a type safe data value without having to re-compute pointer 38A, even after invoking the "moveNext" method.

After, object model 28 receives either a type safe data value or a generic object, the object model 28 invokes the "moveNext" method and determines whether it has satisfied, or finished processing, the data access request (52, 54). If object model 28 determines it is not finished ("NO" 54), it again next invokes the "getElement" method to retrieve the next portion of requested data, determines if it is finished, and continues this process until it retrieves all requested data (52, 54, 56).

If object model 28 determines that it finished processing, or satisfied, the data access request, it returns the requested data to the one of planning applications 25 that issued the data access request.

In this manner, by implementing the double dispatch data retrieval technique, object model 28 may utilize a generic indexer yet assure type safety of requested data as it was previously assured during compilation, unlike conventional data retrieval techniques that must face type safety issues during runtime. Moreover, because indexers 34 remain generic, numerous type-specific indexers each instantiated according to their type-specific class are not needed to ensure type safety, thereby keeping the complexity of the interface relatively low. Finally, the optimization discussed above may enable quick and efficient data retrieval despite implementation of the more sophisticated double dispatch data retrieval technique.

Various embodiments of the invention have been described. These and other embodiments are within the scope of the following claims.

The invention claimed is:

1. A computer-implemented method comprising:
    storing a multi-dimensional dataset object to an object store within an enterprise software system, wherein the dataset object stores a plurality of data elements arranged according to a plurality of dimensions, and further wherein the dataset object provides an interface having a first function for instantiating an indexer object for referencing the data elements of the dataset and a second function that receives as input the indexer object and returns a type-specific value of one or more of the data elements based on reference information maintained by the indexer object, wherein at compile time for the dataset object, a compiler has ensured type safety for the dataset object based on the type of the type-specific value, and wherein the indexer object is instantiated as a non-type-specific indexer object capable of referencing data of any type within the dataset object;
    invoking the first function to instantiate the indexer object within the object store;
    utilizing the indexer object to reference one of the data elements of the dataset object; and
    invoking the second function and passing the indexer object as a parameter to the second function to retrieve a type-specific value of the data element referenced by the indexer object.

2. The method of claim 1, further comprising traversing, with the indexer object, a custom view of the data set to sequentially follow a pattern described by the custom view and traverse the underlying dataset in a non-sequential pattern.

3. The method of claim 2, wherein invoking the first function comprises invoking a first function included within the object store, wherein the instantiated indexer object includes a pointer that references a current one of the plurality of data elements and an identifier for the dataset object that instantiated the indexer.

4. The method of claim 3, wherein invoking the first function to instantiate the indexer object comprises dynamically generating a custom indexer class at runtime and then instantiating an instance of the custom indexer class, and wherein one or more subsequent invocations of the first function to instantiate the indexer object do not need to regenerate the custom indexer class.

5. The method of claim 3, wherein utilizing the indexer object comprises invoking a third function included within another interface provided by the indexer object to adjust the pointer to reference another one of the plurality of data elements according to the pattern.

6. The method of claim 5, wherein the third function comprises a moveNext function.

7. The method of claim 3,
    wherein the dataset object provides the interface having the second function by providing an interface having a getElement function that returns type-specific data stored to the one of the plurality of data elements referenced by pointer, and
    wherein invoking the second function comprises invoking the getElement function and passing the indexer object as a parameter to the getElement function to retrieve type-specific data stored to the one of the plurality of data elements referenced by the pointer.

8. The method of claim 7, further comprising:
    determining whether the dataset object instantiated the indexer object based on the identifier of the indexer object; and
    computing the value of the pointer according to the pattern based on the determination.

9. The method of claim 8, wherein computing the value of the pointer comprises:
    computing the value of the pointer according to the pattern upon determining the dataset did not instantiate the indexer object; and
    dereferencing the pointer without computing the pointer value upon determining the dataset instantiated the indexer object.

10. The method of claim 1,
wherein the dataset object provides the interface having the first function by providing an interface having a getIndexer function for instantiating the indexer object, and
wherein invoking the first function comprises invoking the getIndexer function to instantiate the indexer object within the object store.

11. A computing system comprising:
a memory comprising an object store for storing a multi-dimensional dataset object, wherein the dataset object stores a plurality of data elements arranged according to a plurality of dimensions, and further wherein the dataset object provides an interface having a first function for instantiating an indexer object for referencing the data elements of the dataset object and a second function that receives as input the indexer object and returns a type-specific value of one of the plurality of data elements based on reference information maintained by the indexer object, wherein at compile time for the dataset object, a compiler has ensured type safety for the dataset object based on the type of the type-specific value, and wherein the indexer object is instantiated as a non-type-specific indexer object capable of referencing data of any type within the dataset object; and
a processor that executes an object model that stores the multi-dimensional dataset object to the object store, invokes the first function to instantiate the indexer object within the object store, utilizes the indexer object to reference one of the data elements of the dataset object, and invokes the second function and passes the indexer object as a parameter to the second function to retrieve a type-specific value of the data element referenced by the indexer object.

12. The computing system of claim 11, wherein the object model invokes the first function by invoking a first function that instantiates the indexer object by instantiating an indexer object having a pointer that references one of the plurality of data elements, a pattern, and an identifier within the data store.

13. The computing system of claim 12, wherein the object model utilizes the indexer object by invoking a third function included within another interface provided by the indexer object to adjust the pointer to reference another one of the plurality of data elements according to the pattern.

14. The computing system of claim 12, wherein the object model invokes the third function by invoking a moveNext function included within another interface provided by the indexer object to adjust the pointer to reference another one of a plurality of data elements according to the pattern.

15. The computing system of claim 12,
wherein the dataset object provides the interface having the second function by providing an interface having a getElement function that returns type-specific data stored to the one of the plurality of data elements currently referenced by the pointer, and
wherein the object model invokes the second function by invoking the getElement function and passing the indexer object as a parameter to the getElement function to retrieve type-specific data of the one of the plurality of data elements referenced by the pointer.

16. The computing system of claim 15, wherein the object model further determines whether the dataset instantiated the indexer object based on the identifier of the indexer object, and computes the value of the pointer according to the pattern based on the determination.

17. The computing system of claim 16, wherein the object model computes the value of the pointer by:
computing the value of the pointer according to the pattern upon determining the dataset did not instantiate the indexer object; and
dereferencing the pointer without computing the pointer value upon determining the dataset instantiated the indexer object.

18. The computing system of claim 11,
wherein the dataset object provides the interface having the first function by providing an interface having a getIndexer function for instantiating the indexer object, and
wherein the object model invokes the first function by invoking the getIndexer function to instantiate the indexer object within the object store.

19. A computer-readable storage medium comprising instructions for causing a programmable processor to:
store a multi-dimensional dataset object to an object store within an enterprise software system, wherein the dataset object stores a plurality of data elements arranged according to a plurality of dimensions, and further wherein the dataset object provides an interface having a first function for instantiating an indexer object and a second function that receives as input the indexer object and returns a type-specific value of one or more of the data elements based on reference information maintained by the indexer object, wherein at compile time for the instructions for the dataset object, a compiler has ensured type safety for the dataset object based on the type of the type-specific value, and wherein the indexer object is instantiated as a non-type-specific indexer object capable of referencing data of any type within the dataset object;
invoke the first function to instantiate the indexer object within the object store;
utilize the indexer object to reference one of the data elements of the dataset object; and
invoke the second function and pass the indexer object as a parameter to the second function to retrieve a type-specific value of the data element referenced by the indexer object.

20. The computer-readable storage medium of claim 19, wherein the instructions cause the processor to invoke the first function by invoking a first function that instantiates the indexer object by creating an indexer object within the object store having a pointer that references one of the plurality of data elements.

* * * * *